United States Patent
Fine et al.

(10) Patent No.: US 6,677,757 B2
(45) Date of Patent: Jan. 13, 2004

(54) METHOD AND APPARATUS FOR DETERMINATION OF ELECTROMAGNETIC PROPERTIES OF UNDERGROUND STRUCTURE

(75) Inventors: Kenneth R. Fine, Englewood, CO (US); Victor M. Grabrian, Denver, CO (US); Volodymyr V. Zrodnikov, Aurora, CO (US); Michael A. Zuev, Aurora, CO (US)

(73) Assignee: Montason Group Limited, BVI, Tortola (VG)

( * ) Notice: Subject to any disclaimer, the term of this patent is extended or adjusted under 35 U.S.C. 154(b) by 0 days.

(21) Appl. No.: 10/091,077

(22) Filed: Mar. 4, 2002

(65) Prior Publication Data

US 2002/0180443 A1 Dec. 5, 2002

Related U.S. Application Data

(60) Provisional application No. 60/271,752, filed on Mar. 9, 2001.

(51) Int. Cl.[7] .................................................. G01V 3/06
(52) U.S. Cl. ..................................... 324/360; 324/527
(58) Field of Search ................................ 324/360, 336, 324/239, 240, 329, 337, 527, 534, 535, 637, 523, 71.1, 536

(56) References Cited

U.S. PATENT DOCUMENTS

| 2,735,980 | A |   | 2/1956  | Wait            |
|-----------|---|---|---------|-----------------|
| 2,953,742 | A |   | 9/1960  | Herbold         |
| 3,315,155 | A |   | 4/1967  | Colani          |
| 3,806,795 | A | * | 4/1974  | Morey ........................ 324/337 |
| 4,039,042 | A |   | 8/1977  | Edwards et al.  |
| 4,063,161 | A |   | 12/1977 | Pardis          |
| 4,114,086 | A | * | 9/1978  | Kaufman ..................... 324/329 |
| 4,247,821 | A | * | 1/1981  | Buselli et al. .............. 324/336 |
| 4,837,514 | A |   | 6/1989  | Spies           |
| 5,563,513 | A |   | 10/1996 | Tasci et al.    |
| 5,646,561 | A |   | 7/1997  | Fanini et al.   |
| 5,708,369 | A |   | 1/1998  | Horn            |
| 5,852,262 | A |   | 12/1998 | Gill et al.     |
| 6,339,333 | B1|   | 1/2002  | Kuo             |

FOREIGN PATENT DOCUMENTS

| WO | WO 00/13046    | 3/2000 |
| WO | WO 01/57555 A1 | 8/2001 |

OTHER PUBLICATIONS

Keller, et al., "Megasource time–domain electromagnetic sounding methods," Geophysics, 49, 953 (1984).

* cited by examiner

Primary Examiner—Jay Patidar
Assistant Examiner—Subhash Zaveri
(74) Attorney, Agent, or Firm—Townsend and Townsend and Crew LLP (57) ABSTRACT

A method is provided for detecting geophysical anomalies. Electrical energy is capacitively accumulated with a charging circuit until a breakdown voltage of a switch is reached. Thereafter, the accumulated electrical energy is discharged by passing a discharge current through a transmitter antenna to transmit an electromagnetic pulse into a geophysical region. This technique allows an increase in the strength of an electromagnetic sounding signal, while simultaneously reducing energy consumption, and thereby also permitting smaller weights and dimensions for the power supply.

33 Claims, 10 Drawing Sheets

METHOD AND APPARATUS FOR DETERMINATION OF ELECTROMAGNETIC PROPERTIES OF UNDERGROUND STRUCTURE

CROSS REFERENCE TO RELATED APPLICATION

This application is a nonprovisional of and claims priority to U.S. Prov. Pat. Appl. No. 60/271,752 entitled "METHOD AND APPARATUS FOR ELECTROMAGNETIC SOUNDING OF GEOPHYSICAL ANOMALIES," filed Mar. 9, 2001 by Kenneth R. Fine et al., the entire disclosure of which is herein incorporated by reference in its entirety for all purposes.

BACKGROUND OF THE INVENTION

The present invention relates generally to the detection of geophysical anomalies. More specifically, it relates to a method and apparatus for electromagnetic sounding of geophysical anomalies.

One application for techniques that detect geophysical anomalies is directed at the detection and identification of hydrocarbon traps within the earth, either under land or under water, particularly for oil and natural gas traps. Currently, a number of techniques are available for providing data from which such detection can be made by electromagnetic sounding of part of the Earth. These techniques exploit the electromagnetic-response differences that result from the different electrical properties of hydrocarbon traps. Electromagnetic waves scattered through the Earth in the region of such hydrocarbon traps may generate a response that includes anomalies when compared with the electromagnetic response for a homogeneous Earth. An explanation of specific geophysical characteristics that give rise to such different electrical properties is provided, for example, in U.S. Pat. No. 5,563,513, which is herein incorporated by reference for all purposes.

Techniques for generating and propagating the electromagnetic fields, and for collecting the response signals, generally use a structure such as described in U.S. Pat. No. 3,315,155, which is herein incorporated by reference for all purposes. In such structures, a source for direct current is provided in electrical communication with a conductive loop and a damping resistor through a switch. When current flows through the conductive loop it generates a propagating electromagnetic field in accordance with the Maxwell equations. In such applications, the current is provided with a continuous bipolar waveform.

Typically, current is permitted to flow according to a damped sinusoid or bell-like profile having a duration between about 1 and 50 milliseconds depending on the operating characteristics of the power source and on the conductance of the Earth in the region being examined. With such a current profile, each current step induces eddy currents in the subsurface, which in turn induce magnetic-field changes that are measured by a magnetic-field receiver. The electrical structure, such as resistivity and conductance characteristics, is deduced from the amplitude and shape of the received magnetic fields. Methods for reducing noise may also be incorporated, such as that described in U.S. Pat. No. 4,837,514, which is herein incorporated by reference for all purposes, and in which a method is described for increasing the depth for electromagnetic sounding by simultaneously measuring and accounting for three orthogonal components of the ambient noise and decay of the induced current.

There are limitations to such methods dictated primarily by the simple fact that increased depth for electromagnetic sounding generally requires larger signal strength, which itself requires a larger power supply. The square wave in typical applications is provided with an amplitude between about 50 and 300 amperes. In one study, described in Keller et al., "Megasource time-domain electromagnetic sounding methods," *Geophysics*, 49, 953 (1984), which is herein incorporated by reference for all purposes, a square wave having a peak-to-peak amplitude of 2000 amperes was provided through a grounded antenna. However, this required including a power supply that generated 1,000,000 watts of power.

There is accordingly a need in the art for a system that allows the depth of investigation to be increased while simultaneously reducing the power of the transmitter power supply.

SUMMARY OF THE INVENTION

Thus, embodiments of the invention provide a method and apparatus that allows an increase in the strength of an electromagnetic sounding signal, while simultaneously reducing energy consumption, and thereby also permitting smaller weights and dimensions for the power supply. In one embodiment, a method is provided for detecting geophysical anomalies. Electrical energy is capacitively accumulated with a charging circuit until a breakdown voltage of a switch is reached. Thereafter, the accumulated electrical energy is discharged by passing a discharge current through a transmitter antenna to transmit an electromagnetic pulse into a geophysical region. The discharge current may define a circuit having a magnetic moment up to $10^9$–$10^{11}$ Am$^2$. Alternatively, the discharge current may define a linear moment up to $10^8$–$10^{10}$ Am. The geophysical region may comprise a volume of earth, may comprise a volume of water, or may comprise a volume of earth beneath a water body in different embodiments.

The method may also comprise receiving a response electromagnetic signal with a receiver antenna. The response electromagnetic signal is transformed into a response electrical signal, which is then compared with the discharge current. Such a comparison may comprise Fourier transforming time dependencies of the discharge current and of the response electrical signal into a frequency domain. Additionally, the discharge current may be synchronized with the response electrical signal as part of the comparison.

In one embodiment the discharge current comprises a damped sinusoid having a frequency co less than $250\rho/\mu_0 r^2$, where $\rho$ is an average resistivity of the geophysical region, $\mu_0$ is the permeability of space, and r is a separation between the transmitter antenna and the receiver antenna. In another embodiment, the discharge current comprises a damped sinusoid and electrical energy is accumulated and discharged for a plurality of distinct frequencies of the damped sinusoid. In another embodiment, the discharge current comprises a bell-shaped pulse.

In one embodiment, the charging circuit includes a low-voltage power supply, a high-voltage power supply, and a first resistor connected in series with an impulse discharge capacitor. In addition to the transmitter antenna, the discharge circuit may include a second resistor connected in series with the impulse discharge capacitor and connected in parallel with the charging circuit.

In an embodiment, the switch comprises a first electrode in electrical communication with the impulse discharge capacitor and a second electrode in electrical communication with the transmitter antenna, the first and second electrodes being separated by a discharge gap. The first and/or second electrodes may be configured to be moveable with respect to each other.

In an embodiment, the transmitter antenna comprises at least two parallel wires, the ends of which are connected. In another embodiment, the transmitter antenna comprises a partially shielded circuit arrangement. A conductive portion of the transmitter antenna may be housed within a hermetically sealed enclosure and electrically insulated enclosure. In one particular embodiment, the conductive portion of the transmitter antenna may be housed within a flexible hermetically sealed and electrically insulated enclosure with a gas at more than atmospheric pressure. In another particular embodiment, the discharge gap is also housed within the hermetically sealed enclosure with a gas at less than atmospheric pressure. In still a further particular embodiment, the first and second electrodes are housed within a solid tube, within which a gas is flowed from an inlet to an outlet of the tube.

A receiver arrangement may include a receiver antenna configured to detect response electromagnetic signals. A first recording element is connected with the discharge circuit and a second recording element is connected with the receiver antenna. A synchronization system is configured to synchronize signals received by the first and second recording elements. In a further embodiment, the receiver arrangement includes an acoustic receiver configured to detect response acoustic signals.

BRIEF DESCRIPTION OF THE DRAWINGS

These and other embodiments of the present invention, as well as its advantages and features are described in more detail in conjunction with the text below and the attached figures, in which similar reference numerals are used throughout the several drawings to refer to like elements. Where a figure has subparts, denoted by "(a)," "(b)," etc., and reference is made to the figure, it is intended that all subparts of that figure are referred to.

DESCRIPTION OF THE SPECIFIC EMBODIMENTS

Embodiments of the invention are directed to a method and apparatus for electromagnetic sounding of geophysical anomalies. In some embodiments, the anomalies are underground anomalies; in other embodiments, the anomalies are located in the ground under a water body; in still other embodiments, the anomalies are located in a water body. In any of such cases, use of the method and/or apparatus of the invention provides data that may be used to discriminate the position and character of the anomalies by comparing the data with geophysical models for homogeneous ground or water environments as appropriate. The types of anomalies that may be discriminated with embodiments of the invention include, without limitation, contrasts in electrical resistivity and in dielectric permittivity; in those embodiments where acoustic scattering is also used, anomalies may comprise, for example, changes in density and sound velocity. Such anomalies may be indicative of a wide variety of features such as oil deposits, natural gas traps, mineral deposits, subterranean water, land mines, explosives, etc. A variety of other such features may be readily recognized by those of skill in the art.

Figure 1A:
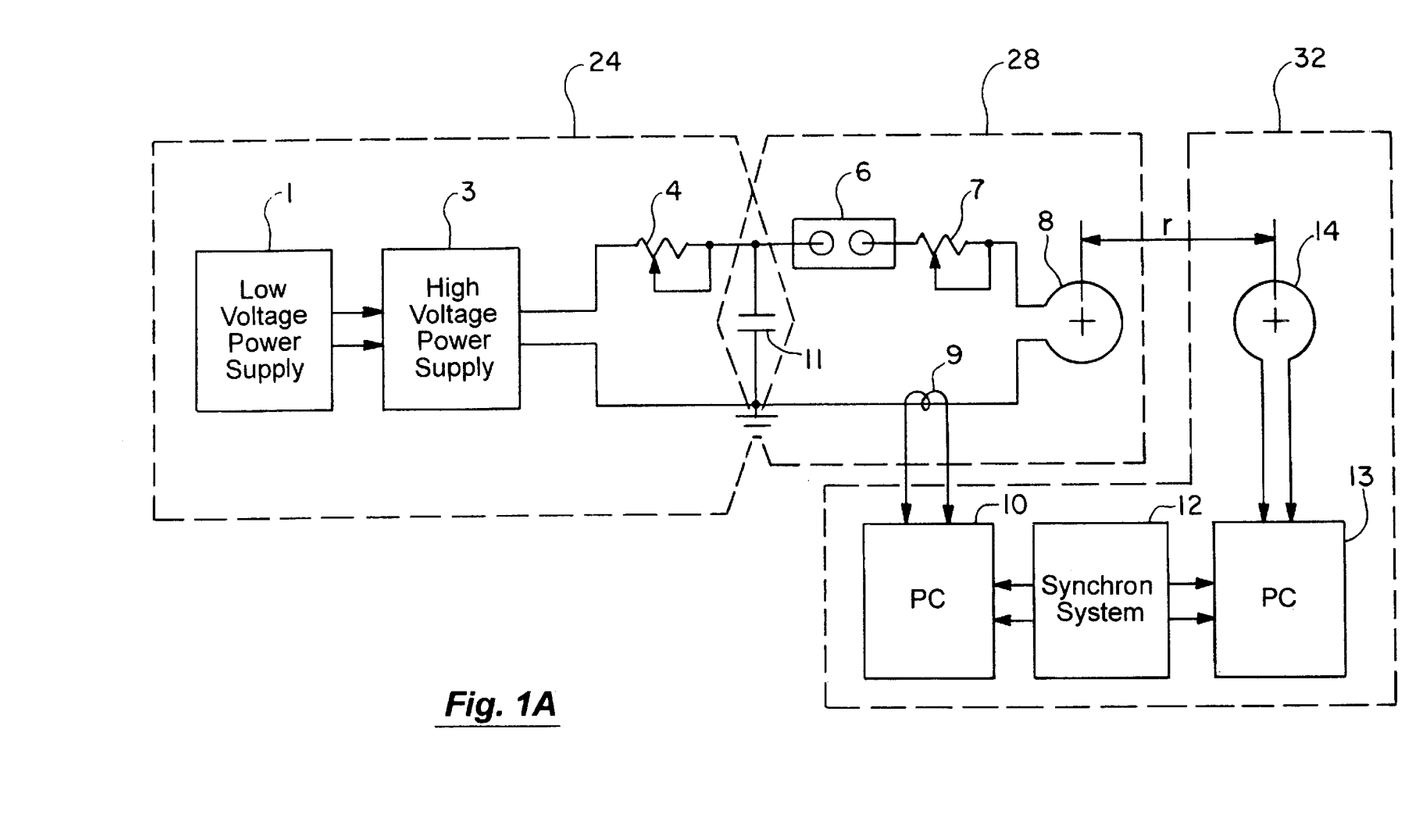
FIG. 1A is a schematic illustration of one embodiment of a transmitter and receiver arrangement in accordance with the invention.

A schematic view of one embodiment of a transmitter and receiver arrangement in accordance with the invention is provided in FIG. 1A. The transmitter arrangement includes a set of components that comprise a transmitter charge circuit 24 and a set of components that comprise a transmitter discharge circuit 28. The components that comprise the receiver arrangement are denoted generally by box 32. In the illustrated embodiment, the transmitter charge circuit 24 includes a low-voltage power supply 1, a high-voltage power supply 3, a variable charge resistor 4, and an impulse discharge capacitor 11. The transmitter discharge circuit 28 includes the impulse discharge capacitor 11, a switch 6, a variable damping resistor 7, and a transmitter antenna 8 connected in series, together with signal line 9 for connection with the first recording element 10 described below.

The receiver arrangement 32 is comprised by a receiver antenna 14, a first recording element 10, a second recording element 13, and a synchronization system 12 configured to synchronize signals received by the first and second recording elements. Either or both of the first and second recording elements may be, for example, a personal computer although alternative recording elements may be substituted. In some embodiments, the recording elements 10 and 13 are additionally configured to function as analysis elements to analyze the data, while in other embodiments the analysis is performed separately. The transmitter signal line 9 is connected with the first recording element 10 configured to record the transmission signal. The receiver antenna 14 is similarly connected with the second recording element 13 to record the received electromagnetic response signal.

The transmitter antenna 8 and the receiver antenna 14 are configured for electromagnetic sounding. For example, in one embodiment, the transmitter antenna 8 is a wire loop transmitter. The loop may be configured in an approximately circular arrangement or may have other configurations. For certain applications where the loop is configured circularly, it has a diameter between 50 and 600 meters, although smaller and larger diameters may alternatively be used for other applications. Alternatively, the transmitter antenna 8 may be configured as linear-wire transmitter; such an embodiment may be useful where, for example, the transmitter antenna 8 is to be disposed on the bottom of a water body. In one embodiment, the receiver antenna 14 is a magnetometer receiver antenna, which may be disposed on the surface of the ground when searching for underground anomalies, or may be disposed on or beneath the water surface when searching for underwater anomalies.

In one embodiment, the transmitter antenna 8 includes at least two parallel wires, the ends of which are connected together. Such a configuration permits the transmitter antenna 8 to have reduced resistance and inductance, thereby permitting the strength of the transmitted electromagnetic signal to be stronger. In addition, the transmitter antenna 8 may include an insulating tube into which one wire end is inserted, the insulating tube being filled with compressed air and connected to the atmosphere by at least one hermetic valve. In addition to permitting a loop to be formed with the correct radius and increasing the insulating level of the transmitter antenna 8, such a configuration also allows the transmitter antenna to be positioned on a water surface and/or underwater. In another embodiment, the transmitter antenna 8 includes a plurality of turns of wires in series. This permits a simultaneous increase in the strength of the transmitter signal and a decrease in the diameter of the loop.

Figure 1B:
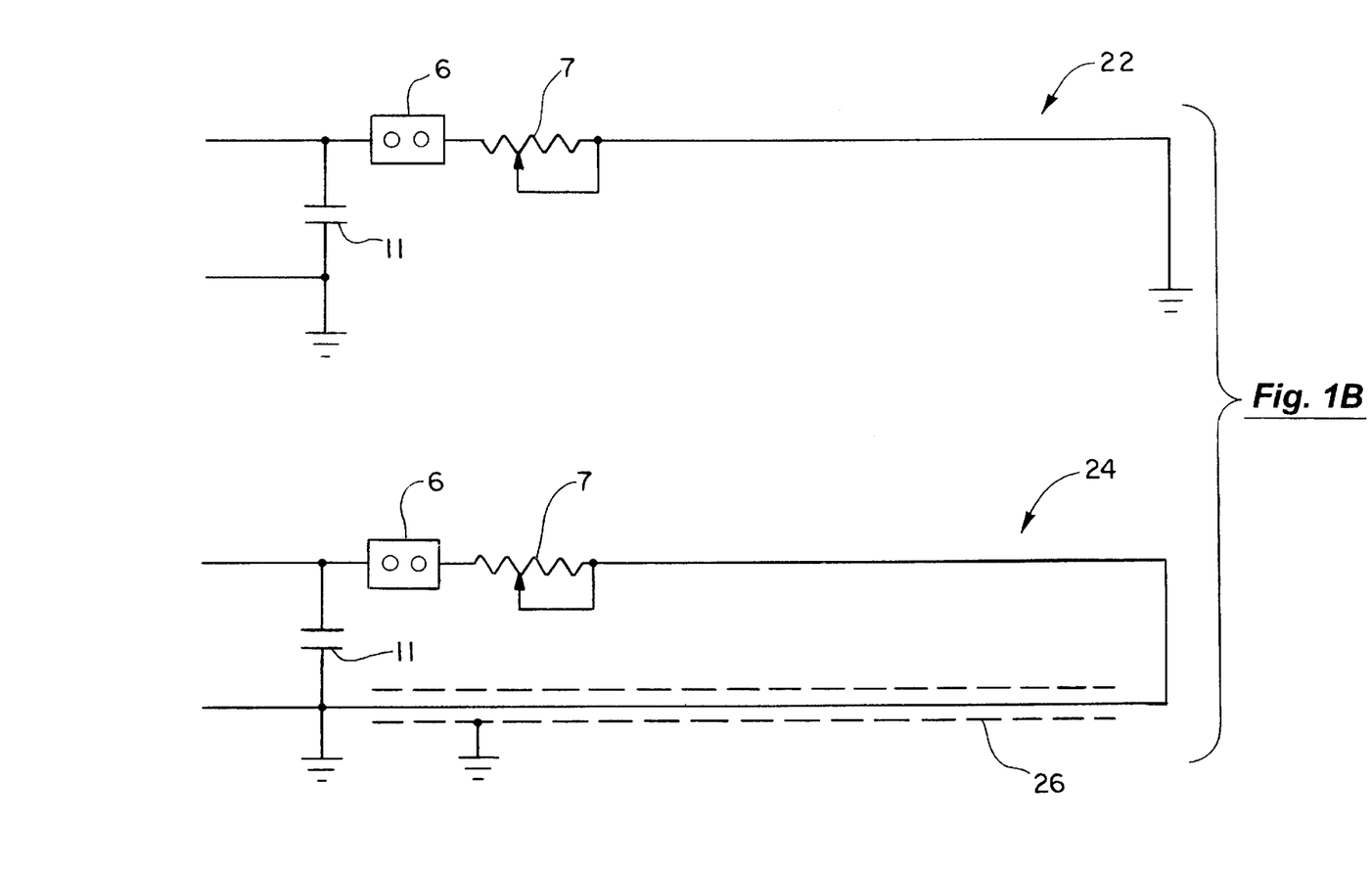
FIG. 1B is a schematic illustration of an circuit arrangement that may be used to produce a straight-line antenna configuration.

In other embodiments, the receiver antenna 14, like the transmitter antenna 8, may be configured with a linear-wire configurations rather than with wire loops. FIG. 1B provides an illustration of how a circuit arrangement may be used to produce the equivalent of a straight-line antenna. The top portion of FIG. 1B shows schematically the arrangement 22 whose effects are to be reproduced. The bottom portion of FIG. 1B shows a circuit arrangement 24 that includes shielding 26 along a portion of the circuit arrangement 24. Such shielding 26 causes the circuit arrangement 24 to function as a straight-line antenna while retaining the convenience of a circuit arrangement for integrating it into arrangements shown in FIG. 1A.

Figure 2:
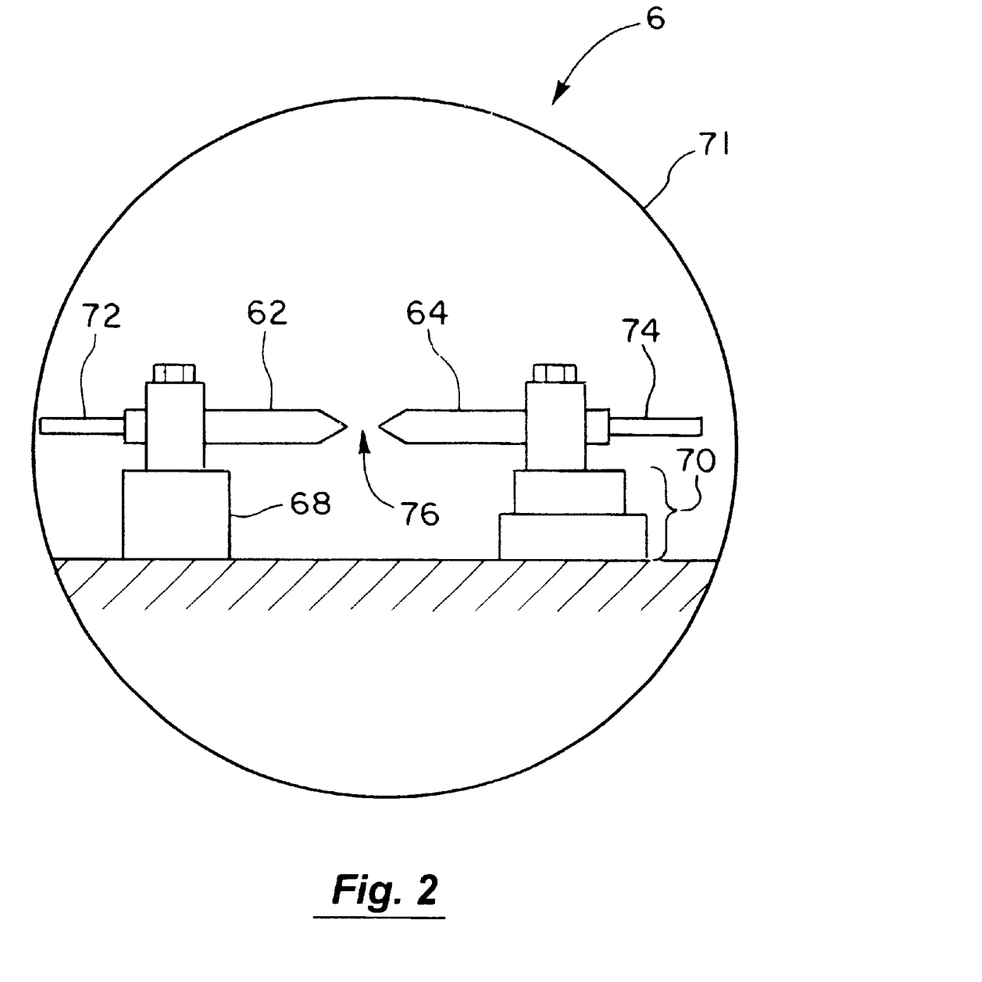
FIG. 2 is a cross-section view of a spark-discharge electrode arrangement used in embodiments of the invention.

One embodiment for the switch 6 is shown in FIG. 2, where it is configured as a spark discharge switch. A first electrode 62 that is in electrical communication with the impulse discharge capacitor 11 through connection 72 is supported by a fixed insulating plate 68. A second electrode 64 that is in electrical communication with the transmitter antenna 8 through connection 74 is supported by a moveable insulating plate 70. The electrodes 62 and 64 are thus separated by a gap 76 that can be adjusted by relatively moving the moveable insulating plate 70. In one embodiment, such a spark discharge switch is inserted within the hermetically sealed tube 71 with an inert gas. This hermetically sealed tube 71 may additionally contain an explosive gas for creating a single high-intensity seismic wave as a result of the gas explosion following the spark discharge. In alternative embodiments, the spark discharge electrodes 62 and 64 are inserted within an open tube through which a gas is flowed from an inlet to an outlet; the longitudinal axis of the electrodes may be disposed perpendicularly to the longitudinal axis of the tube. This arrangement permits cooling of the electrodes and evacuation of pollutants resulting from the spark discharge process. In another embodiment, suitable for applications in which the transmitter current is relatively small, the switch 6 may instead comprise an electronic switch suitable for such a current level.

Figure 3:
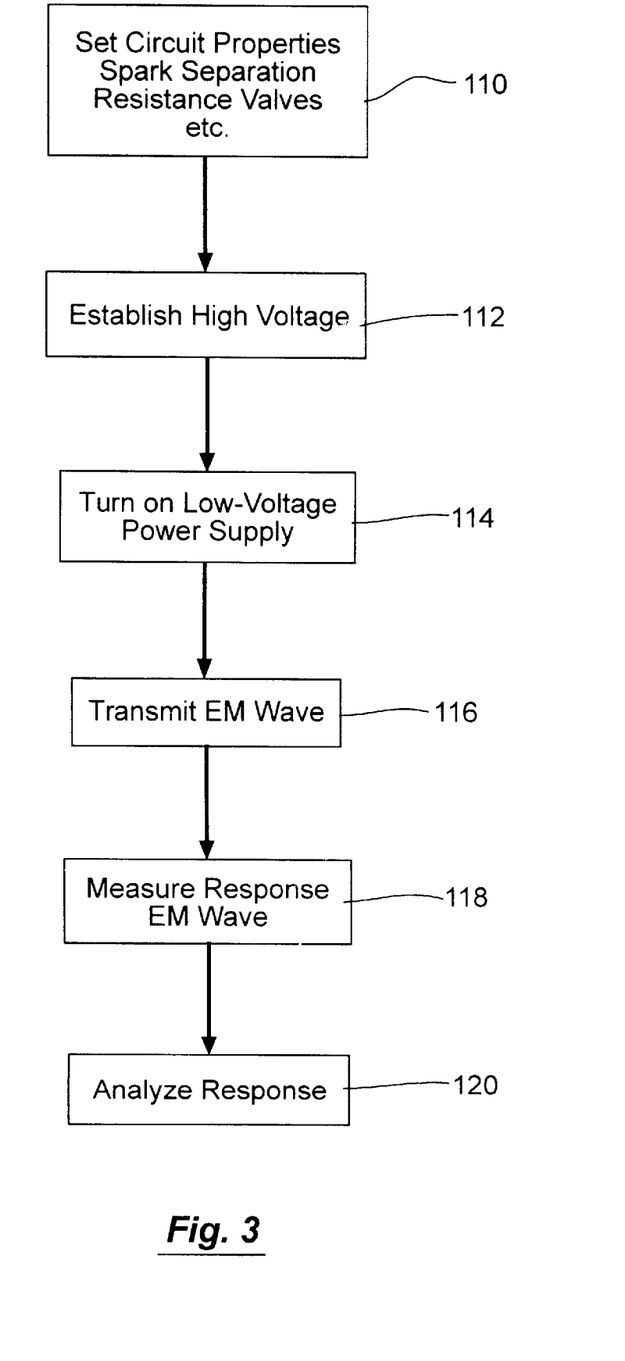
FIG. 3 is a flow diagram illustrating one procedure that may be used according to the invention.

FIG. 3 provides a flow diagram illustrating how the configuration shown in FIG. 1A may be used. At step 110, the properties of the current are established. The current of the transmitter charge circuit 24 is established by setting the resistance of the variable charge resistor 4. The breakdown voltage of the transmitter discharge circuit 28 is established by setting the gap 76 of the spark discharge circuit 6. A pulse duration is established by setting the resistance of the variable damping resistor 7 as well as the resistance and inductance of the transmitter antenna 8. Prior to start-up, a high voltage V of the transmitter charge circuit is created using the high-voltage power supply 3 at step 112. The low-voltage power supply 1 is then turned on at step 114.

The low-voltage power supply 1 and the high-voltage power supply 3 cause charge current to flow through the impulse discharge capacitor 11. When the voltage of the impulse discharge capacitor 11 reaches the predetermined breakdown voltage defined by the spark discharge gap 76, a pulse current is introduced into the transmitting antenna 8.

The shape of the pulse current is dictated by the values chosen for the circuit elements. In addition to the resistance R of the variable damping resistor 7, the transmitter discharge circuit 28 includes in series a capacitance C provided by the impulse discharge capacitor 11, an inductance L, and an additional resistance provided by the transmitter antenna 8. Accordingly, the transient current behavior of the transmitter discharge circuit 28 may be expressed according to results for an RCL circuit, which may usefully be parameterized in terms of the dimensionless parameter $$p \equiv \frac{R}{2}\sqrt{\frac{C}{L}}.$$

For p<1, the transient current behavior is limited by two voltages that define the spark-gap discharge—$V_0$, which is the breakdown voltage for a cold discharge gap, and $V_{hot}$, which is the breakdown voltage for the hot discharge gap conditions, which arise after a first discharge period. The spark discharge process stops after N half cycles, where $$N = 1 + int\left[\frac{\sqrt{1-p^2}}{\pi p}\ln\frac{V_0}{V_{hot}}\right],$$

and the transient current is a damped sinusoid:

$$I\left(t < N\pi\sqrt{\frac{LC}{1-p^2}}\right) = V_0\sqrt{\frac{C}{L}}\frac{e^{-pt/\sqrt{LC}}}{\sqrt{1-p^2}}\sin\left(\sqrt{\frac{1-p^2}{LC}}\,t\right).$$

The natural frequency of the circuit is $$\omega = \sqrt{\frac{1-p^2}{LC}} = \sqrt{\frac{1}{LC} - \frac{R^2}{4L^2}}.$$

Figure 4:
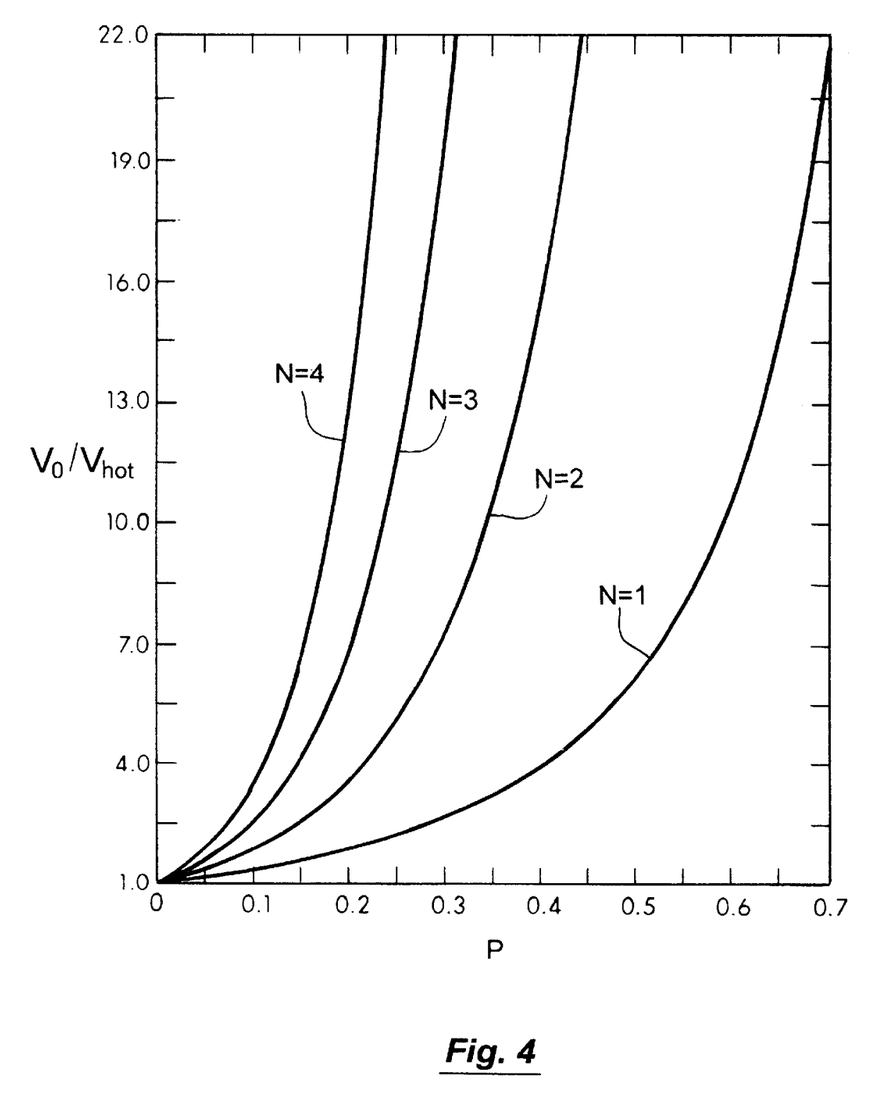
FIG. 4 is a graph showing the breakdown voltage behavior as a function of dimensionless parameter p.

A plot is provided in FIG. 4 of a set of curves where the current pulse exists for an exact integer N number of half cycles:

$$\left[\frac{V_0}{V_{hot}}\right]_N = e^{\pi pN/\sqrt{1-p^2}}.$$

The labeled values of N on the graph denote regions where that number of half cycles is provided for given values of p and $V_0/V_{hot}$. Thus, from the plot in FIG. 4, the relative value $V_0/V_{hot}$ for a given electrode configuration can be determined from experimental results by progressively changing p, such as by changing the circuit resistance, and ascertaining when a new half cycle appears. The value can then subsequently be used in selecting circuit parameters to achieve a specifically desired transient current shape.

For p>1, the current has a bell-shaped profile:

$$I(t) = \frac{V_0}{2\sqrt{p^2-1}} \sqrt{\frac{C}{L}} \left[ e^{-(p-\sqrt{p^2-1})t/\sqrt{LC}} - e^{-(p+\sqrt{p^2-1})t/\sqrt{LC}} \right].$$

For p=1, the current decays exponentially:

$$I(t) = \frac{V_0}{L} t e^{-t/\sqrt{LC}}.$$

Figure 5A:
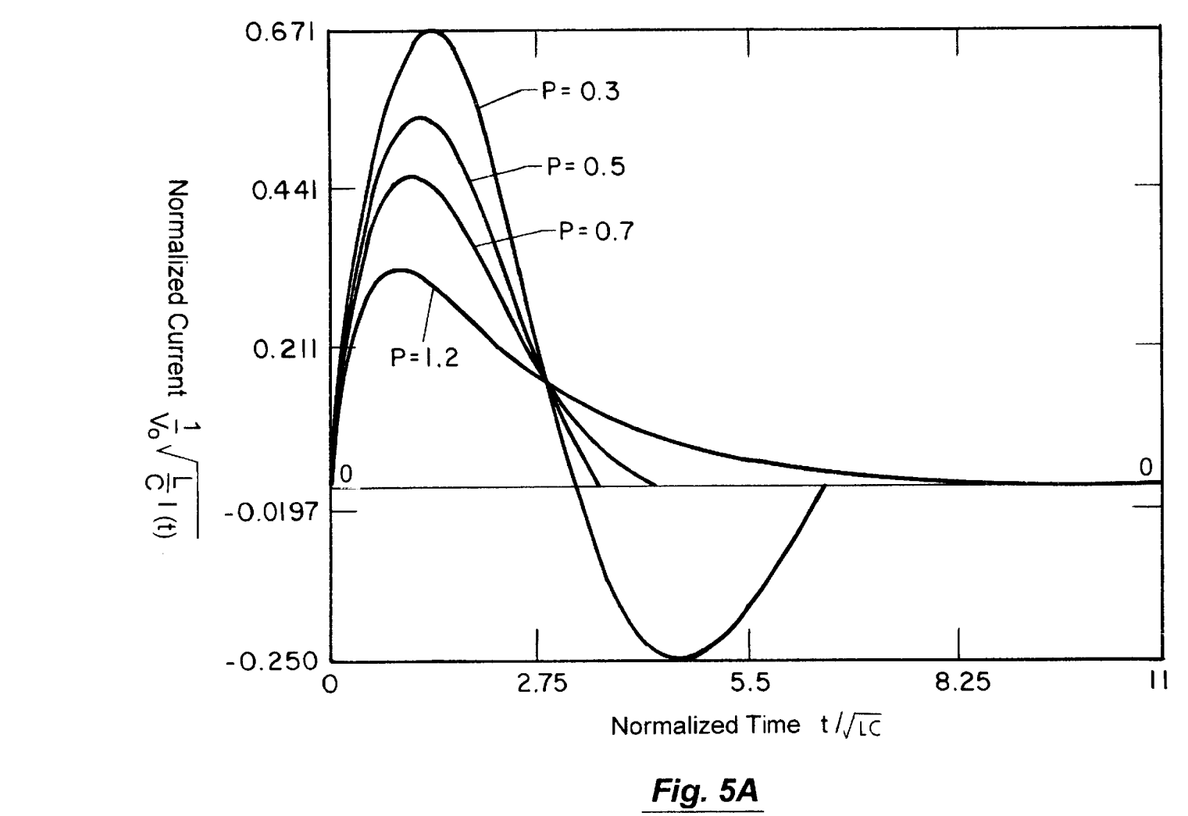
FIGS. 5(a) and 5(b) are graphs respectively illustrating calculated and measured time-domain current pulses that may be provided to the transmitting antenna.

Examples of these curves for several values of p are provided in FIG. 5(a) for $V_0/V_{hot}=5$. The results are displayed in terms of normalized current $$\frac{1}{V_0}\sqrt{\frac{L}{C}} I(t)$$

and normalized time $t/\sqrt{LC}$.

Figure 5B:
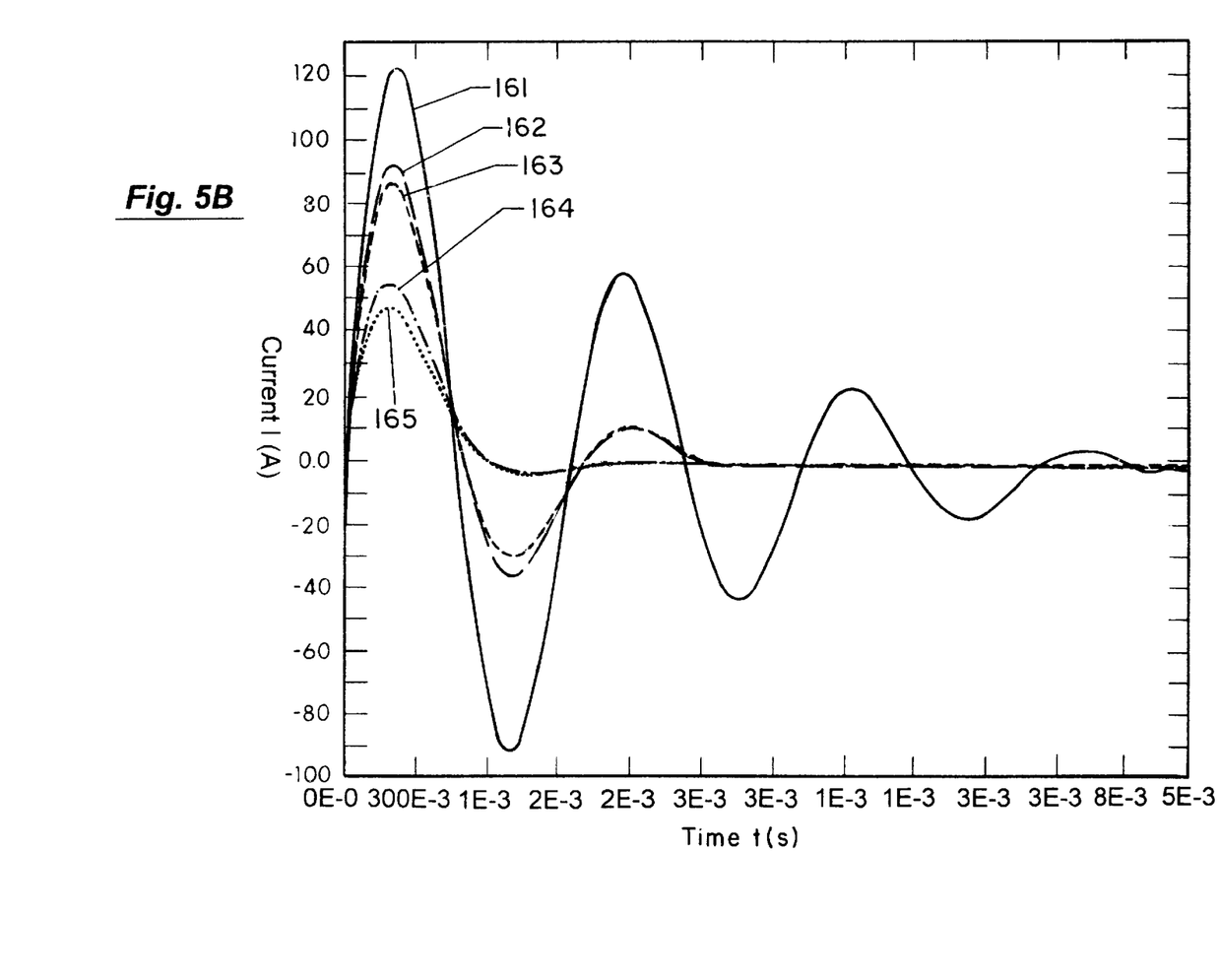

Examples of measured current pulses are shown in FIG. 5(b) using physical units for various resistances R of a circuit having a fixed capacitance C=35 µF, a fixed inductance L=1995 µH, and a spark gap 76 of 0.965 mm. The curves are labeled in the figure as 161–165 and correspond to the resistances R set forth in the following table. Also noted in the table is the minimum current value.

| Curve | Resistance R (Ω) | Current I$_{max}$ (A) |
| --- | --- | --- |
| 161 | 1.6 | 122 |
| 162 | 4.4 | 92 |
| 163 | 4.8 | 86 |
| 164 | 9.0 | 55 |
| 165 | 9.1 | 48 |

This transient current produces a variable electromagnetic field that is transmitted by the transmitting antenna 8 at step 116. The transmitted field is spread through the earth and/or water in the vicinity of the sounding zone. The maximum frequency response of this electromagnetic field is defined by $$\omega_{EM} \leq \frac{250\rho}{\mu_0 r^2},$$

where ρ if the average resistivity of the geophysical region, $\mu_0$ is the permeability of space, and r is the separation between the transmitting antenna 8 and the receiver antenna 14 (as noted explicitly in FIG. 1A).

Figure 6:
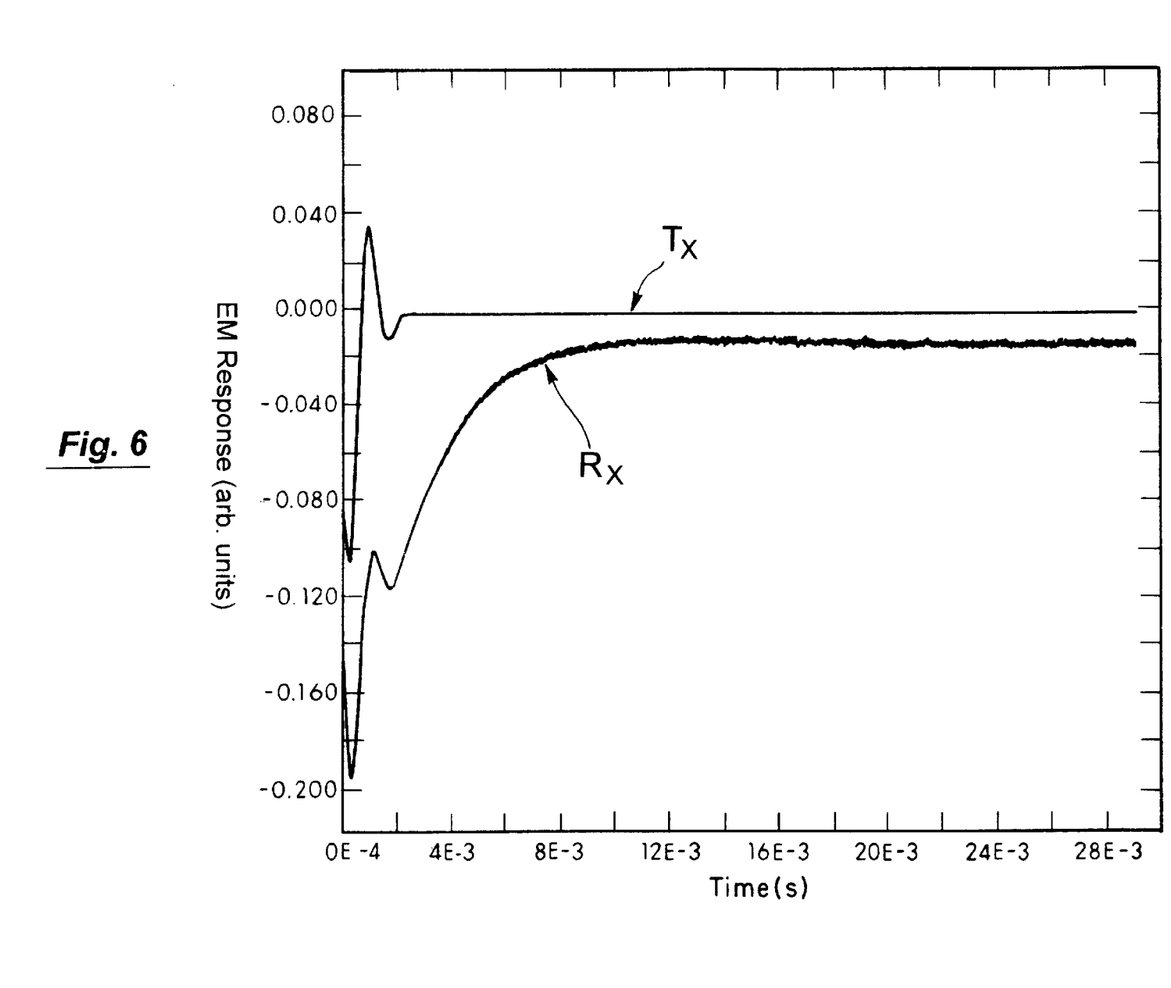
FIG. 6 is a graph illustrating typical measured Earth response signals to a damped sinusoidal current pulse.

The receiver antenna 14 detects and measures the ground and/or water response at step 118 and it is record by the second recording element 13. Simultaneously, the first recording element records the pulse current provided to the transmitter antenna 8. Synchronization between the transmitted pulse and the received pulse is achieved with the synchronization system 12. FIG. 6 shows an example of the time dependence of a transmitted signal and measured response signal, with the transmitted signal being denoted by $T_x$ and the response signal being denoted by $R_x$. The $T_x$ signal exhibits the damped sinusoidal dependence described above. The $R_x$ signal includes features attributable to the existence of geophysical anomalies. In addition, the $R_x$ signal may include noise signals, such as 60-Hz and higher harmonics resulting from nearby power transmission. Use of the synchronization system 12 mitigates trigger problems that would otherwise result if the collection of data were dictated by the presence of fields similar in magnitude to such ambient fields without relying on wire-link or RF transmission paths. In addition, synchronization permits the normalization of the received field to the transmitted field.

Figure 7:
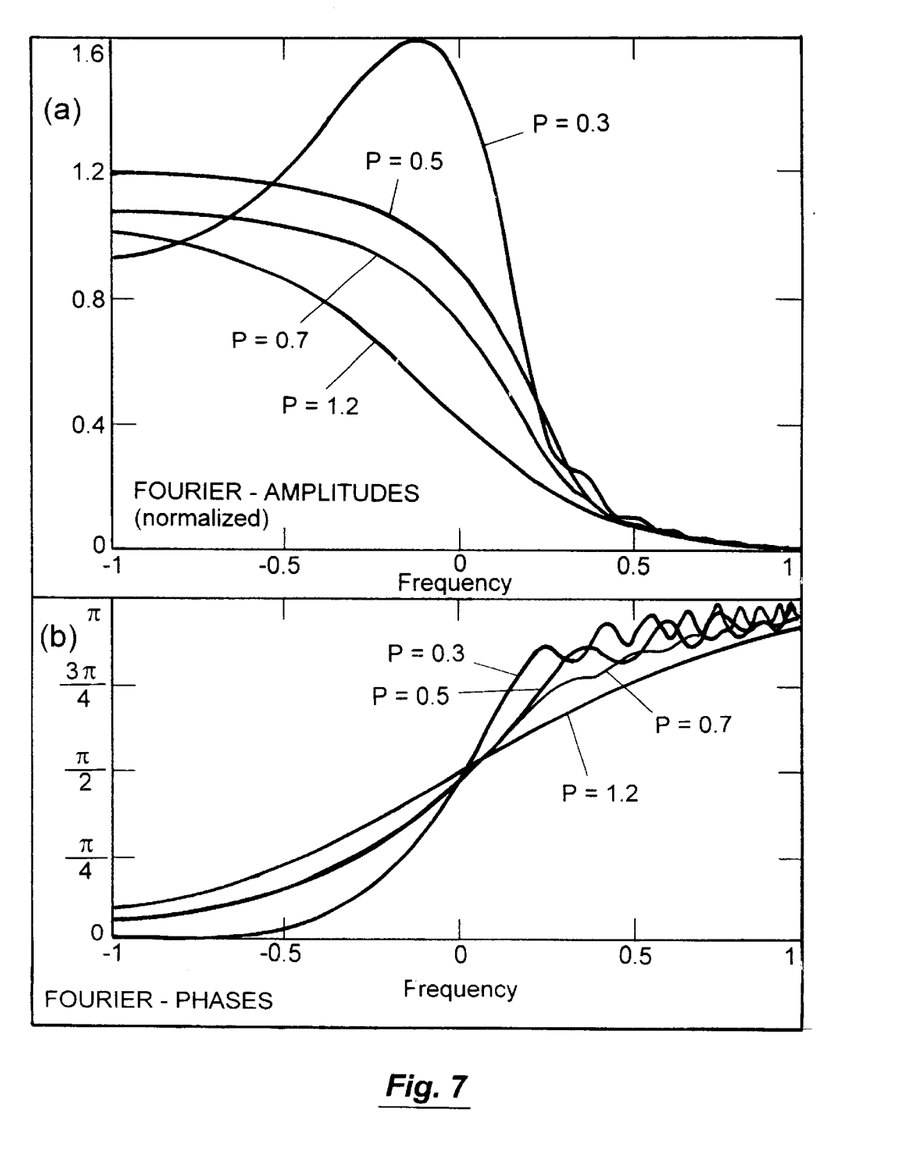
FIG. 7 is a graph illustrating frequency-domain transmitted signals after Fourier transformation for various damped sinusoidal transmitted current pulses: in part (a) normalized amplitudes are shown and in part (b) phases are shown.

The response signal is analyzed at step 120. There are various methods that may be used by those of skill in the art to perform the analysis. For example, the time-domain response signal $R_x$ may be compared with geophysical time-domain models to identify signal components from anomalies. Alternatively, the response signal may be Fourier transformed into the frequency domain by a technique such as Fast Fourier Transformation or Spline Fourier Transformation. Examples of transmitted signals that have been transformed into the frequency domain are provided in FIG. 7. In the frequency domain, the current is $$I(\omega) = \frac{1}{2\pi} \int_{-\infty}^{\infty} dt\, e^{i\omega t} I(t),$$

and may be written in normalized form as $$I(\omega) = \frac{V_0 C}{2\pi} F(\omega).$$

The normalized amplitude and phase can be expressed generally as $$|F|^2 = \frac{1 + \alpha^2 - 2\alpha\cos(w\tau_N)}{1 + (4p^2 - 2)w^2 + w^4}$$

$$\arg F = \cot^{-1}\left(\frac{1-w^2}{2pw}\right) - \tan^{-1}\frac{\alpha \sin(w\tau_N)}{1 - \alpha\cos(w\tau_N)},$$

where a dimensionless frequency $w=\omega\sqrt{LC}$ and dimensionless time $$\tau_N = \frac{\pi N}{\sqrt{1-p^2}}$$

have been introduced. For $p \geq 1$, α=0, and for p<1, α=(−1)$^N e^{-p\tau_N}$. Curves are shown separately for the amplitude and phase of the normalized frequency-domain current respectively in FIGS. 7(a) and 7(b) and are labeled by p. The frequency-domain normalized response may thus similarly be compared with geophysical models to derive information regarding anomalies.

Figure 8:
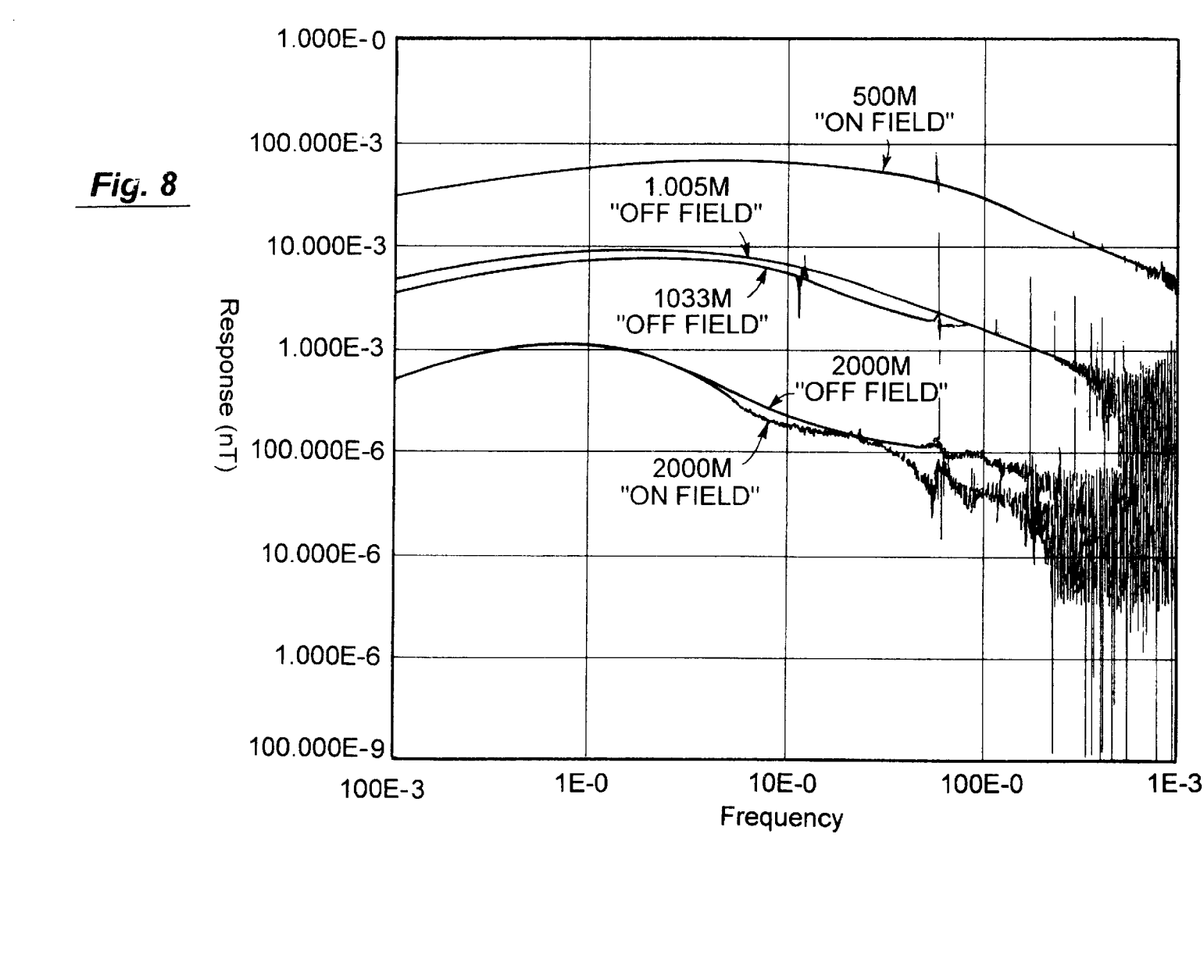
FIG. 8 is a graph showing different frequency-domain components of a response signal after Fourier transformation.

FIG. 8 illustrates the effect that the presence of an anomaly may have on the frequency-domain response. In generating the curves shown in FIG. 8, tests were performed in two areas that were geophysically similar except that one ("on field") was known to have a deposit of natural gas and one ("off field") was known not to have such a deposit. Measurements were taken for different separations r between the transmitter and receiver antennae 8 and 14. At larger separations, a geometric effect results in the response signal being sensitive to greater depths beneath the surface. The results are labeled with the separation and whether the measurement was taken on or off field. In some instances, the results to be compared may have been taken at slightly different separations, e.g. the 1005-m off-field results and the 1033-m on-field results. In such cases, an additional step in the comparison includes normalizing the data; the low-frequency results are expected to overlap. The presence of the natural-gas deposit is manifested in the curves at least in part by the differences between the on- and off-field results at the same separations. Other differences between the curves may exist as a result of different geophysical characteristics of the test regions despite their overall similarity.

The normalized amplitude of the Fourier spectrum has a local maximum at the natural frequency of the damped sinusoid. Information extracted from the response near the locally increased amplitude provides greater accuracy because the signal-to-noise level is higher. Thus, according to one embodiment, a plurality of measurements are made by supplying the transmitter antenna 8 with damped sinusoidal currents having different natural frequencies, the set of such natural frequencies mapping out a range in the frequency domain where the signal-to-noise ratio is thereby enhanced. In one embodiment, the appropriate range of such natural frequencies is $$f \leq \frac{40\rho}{\mu_0 r^2},$$

where, as before $\rho$ is an average resistivity of the geophysical region, $\mu_0$ is the permeability of space, and r is the separation between the transmitter antenna 8 and the receiver antenna 14.

According to further embodiments, acoustic waves are similarly used to provide response information. When a spark is discharged through the spark discharge gap 76, an acoustic wave is created and propagates through the earth and/or water in the vicinity of the spark discharge switch 6. The amplitude of such acoustic waves may be enhanced in those embodiments where a hermetically sealed tube is used to house the spark discharge switch 6 with an explosive gas, the explosion of the gas upon discharge providing a more strenuous acoustic wave. This permits the initial acoustic wave to be recorded using an acoustic receiver positioned and configured to receive response acoustic waves, which can be recorded and synchronized with the transmitted acoustic waves. A comparison of the transmitted and response acoustic waves provides information to recognize the existence of geophysical anomalies. As for the interpretation of the electromagnetic response, Fourier transformation of the time dependent transmitted and received acoustic waves into the frequency domain may be performed as part of the analysis.

Other embodiments of the invention include comparing measurements taken at different times. In particular, the methods and apparatuses described above may be used to identify a geophysical anomaly at a given time. They may then also be used to identify the same geophysical anomaly at a later time, providing information on the possible movement or migration of the anomaly. For example, such information may be of value in applications involving the monitoring of fluid movement of hydrocarbons in a reservoir, or of volcanic or fault activity, among others.

Thus, embodiments of the invention provide a method and apparatus that allows an increase in the strength of an electromagnetic sounding signal, while simultaneously reducing energy consumption, and thereby also permitting smaller weights and dimensions for the power supply. For example, the electromagnetic field may be transmitted by using a damped sinusoidal current having a peak-to-peak current amplitude of 2000 A through the transmitter antenna 8 requires only a 2000-W power supply. For a wire-loop transmitter, the circuit of the transmitter antenna 8 may be characterized in terms of its magnetic moment, equal to the product of the current and loop area. For a current between 1000 and 5000 A, and a circular loop having a diameter between 50 and 500 m, the magnetic moment of the transmitter antenna circuit is between about $10^6$ and $10^9$ Am$^2$. Similarly, for a linear-wire transmitter, it may be characterized in terms of its linear moment, equal to the product of the current and the length of the wire. For a current between 1000 and 5000 A, and a length between 100 m and 5 km, the linear moment is between about $10^5$ and $10^8$ Am. However, there are no significant restrictions preventing an increase or decrease of these moments by factors at least as large as 100.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for determination of electromagnetic properties of underground structure, the method comprising:
   capacitively accumulating electrical energy with a charging circuit until a breakdown voltage of a switch is reached; and
   thereafter, discharging the accumulated electrical energy by passing a discharge current through a transmitter antenna to transmit an electromagnetic pulse into a geophysical region.

2. The method recited in claim 1 further comprising
   receiving a response electromagnetic signal with a receiver antenna;
   transforming the response electromagnetic signal into a response electrical signal; and
   comparing the discharge current with the response electrical signal.

3. The method recited in claim 2 further wherein comparing the discharge current with the response electrical signal comprises Fourier transforming time dependencies of the discharge current and the response electrical signal into a frequency domain.

4. The method recited in claim 3 wherein comparing the discharge current with the response electrical signal comprises synchronizing the discharge current with the response electrical signal.

5. The method recited in claim 2 wherein the discharge current comprises a damped sinusoid, and wherein capacitively accumulating electrical energy and discharging the accumulated electrical energy are performed for a plurality of distinct frequencies of the damped sinusoidal current.

6. The method recited in claim 5 wherein each such distinct frequency is less than $40\rho/\mu_0 r^2$, where $\rho$ is an average resistivity of the geophysical region, $\mu_0$ is a permeability of space, and r is a separation between the transmitter antenna and the receiver antenna.

7. The method recited in claim 1 wherein the discharge current defines a circuit having a magnetic moment between $10^6$ and $10^9$ Am$^2$.

8. The method recited in claim 1 wherein the discharge current defines a linear moment between $10^5$ and $10^8$ Am.

9. The method recited in claim 1 wherein the charging circuit is arranged in accordance with a prior determination of an average resistivity of the geophysical region, an ambient noise level of the geophysical region, and a desired depth of study.

10. The method recited in claim 1 wherein the geophysical region comprises a volume of earth.

11. The method recited in claim 1 wherein the geophysical region comprises a volume of water.

12. The method recited in claim 1 wherein the geophysical region comprises a volume of earth beneath a body of water.

13. The method recited in claim 1 wherein the discharge current comprises a bell-shaped pulse.

14. An apparatus for determination of electromagnetic properties of underground structure, the apparatus comprising:
   a transmitter charge circuit configured to capacitively accumulate energy until a breakdown voltage of a switch is reached; and
   a transmitter discharge circuit including a transmitter antenna, the transmitter discharge circuit configured to discharge the accumulated electrical energy through the transmitter antenna after the breakdown voltage has been reached to transmit an electromagnetic pulse into a geophysical region.

15. The apparatus recited in claim 14 wherein the transmitter charge circuit includes a low-voltage power supply, a high-voltage power supply, and a first resistor connected in series with an impulse discharge capacitor.

16. The apparatus recited in claim 15 wherein the transmitter discharge circuit further includes a second resistor connected in series with the impulse discharge capacitor and connected in parallel with the transmitter charge circuit.

17. The apparatus recited in claim 16 wherein the switch comprises a first electrode in electrical communication with the impulse discharge capacitor and a second electrode in electrical communication with the transmitter antenna, the first and second electrodes being separated by a discharge gap.

18. The apparatus recited in claim 17 wherein the second electrode is further configured to be moveable with respect to the first electrode.

19. The apparatus recited in claim 18 wherein the first and second electrodes are housed within an open tube adapted to permit a flow of gas.

20. The apparatus recited in claim 19 wherein the first and second electrodes define an axis disposed substantially perpendicularly to a longitudinal axis of the open tube.

21. The apparatus recited in claim 17 wherein the transmitter antenna comprises at least two parallel wires, the ends of which are connected.

22. The apparatus recited in claim 17 wherein the transmitter antenna comprises a plurality of wire turns.

23. The apparatus recited in claim 17 wherein the transmitter antenna comprises a partially shielded circuit arrangement.

24. The apparatus recited in claim 17 wherein a conductive portion of the transmitter antenna is housed within a hermetically sealed enclosure.

25. The apparatus recited in claim 24 wherein the enclosure is electrically insulated and contains a gas at greater than atmospheric pressure.

26. The apparatus recited in claim 14 further comprising a receiver arrangement.

27. The apparatus recited in claim 26 wherein the receiver arrangement includes:
   a receiver antenna configured to detect response electromagnetic signals;
   a first recording element connected with the transmitter discharge circuit;
   a second recording element connected with the receiver antenna; and
   a synchronization system configured to synchronize signals received by the first and second recording elements.

28. The apparatus recited in claim 26 further comprising an acoustic receiver configured to detect response acoustic signals.

29. An apparatus for determination of electromagnetic properties of underground structure, the apparatus comprising:
   transmitter charge circuit means for capacitively accumulating energy until a breakdown voltage of a discharge-gap switch means is reached; and
   transmitter discharge circuit means, including transmitter antenna means, for discharging the accumulated electrical energy through the transmitter antenna means after the breakdown voltage has been reached to transmit an electromagnetic pulse into a geophysical region.

30. The apparatus recited in claim 29 wherein the transmitter charge circuit means includes low-voltage power supply means, high-voltage power supply means, and electrical resistive means connected in series with impulse discharge capacitor means.

31. The apparatus recited in claim 29 wherein the transmitter discharge circuit means further includes electrical resistive means connected in series with the impulse discharge capacitor means and connected in parallel with the transmitter charge circuit means.

32. The apparatus recited in claim 29 further comprising receiver means, the receiver means including:
   receiver antenna means for detecting response electromagnetic signals;
   first recording means for recording an electrical signal in the transmitter discharge circuit means;
   second recording means for recording an electrical signal in the receiver antenna means; and
   synchronization means for synchronizing the electrical signals received by the first and second recording means.

33. The apparatus recited in claim 32 further comprising acoustic receiver means for detecting response acoustic signals.

* * * * *

UNITED STATES PATENT AND TRADEMARK OFFICE
CERTIFICATE OF CORRECTION

PATENT NO. : 6,677,757 B2
DATED : January 13, 2004
INVENTOR(S) : Kenneth R. Fine et al.

It is certified that error appears in the above-identified patent and that said Letters Patent is hereby corrected as shown below:

<u>Column 10,</u>
Line 27, after "region" delete "." and insert -- , wherein the discharge current comprises a damped sinusoid having a frequency $\omega$ less than $250\rho/\mu_0 r^2$, where $\rho$ is an average resistivity of the geophysical region, $\mu_0$ is a permeability of space, and $r$ is a separation between the transmitter antenna and a receiver antenna. --
Line 55, after "moment" delete "between $10^6$ and $10^9$" and insert -- up to $10^{11}$ --
Line 58, after "moment" delete "between $10^5$ and $10^8$" and insert -- up to $10^{10}$ --

<u>Column 11,</u>
Line 17, after "region" delete "." and insert -- , wherein the discharge current comprises a damped sinusoid having a frequency $\omega$ less than $250\rho/\mu_0 r^2$, where $\rho$ is an average resistivity of the geophysical region, $\mu_0$ is a permeability of space, and $r$ is a separation between the transmitter antenna and a receiver antenna. --

Signed and Sealed this

Sixth Day of April, 2004

JON W. DUDAS
*Acting Director of the United States Patent and Trademark Office*